(12) United States Patent
Kato

(10) Patent No.: US 8,107,002 B2
(45) Date of Patent: Jan. 31, 2012

(54) IMAGING APPARATUS CAPABLE OF CHANGING FRAME RATE

(75) Inventor: Yoshiyuki Kato, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 518 days.

(21) Appl. No.: 12/329,956

(22) Filed: Dec. 8, 2008

(65) Prior Publication Data

US 2009/0147122 A1 Jun. 11, 2009

(30) Foreign Application Priority Data

Dec. 10, 2007 (JP) ................................. 2007-318028

(51) Int. Cl.
*G03B 7/00* (2006.01)
*H04N 5/238* (2006.01)
(52) U.S. Cl. ........................................ 348/362; 348/364
(58) Field of Classification Search .................. 348/362, 348/364
See application file for complete search history.

(56) References Cited

U.S. PATENT DOCUMENTS

| 7,733,414 | B2 * | 6/2010 | Kobayashi | ..................... 348/362 |
| 2005/0200744 | A1 | 9/2005 | Kobayashi | |
| 2009/0015707 | A1 * | 1/2009 | Hibino et al. | ................. 348/347 |
| 2009/0128683 | A1 * | 5/2009 | Matsumoto | .................... 348/345 |

FOREIGN PATENT DOCUMENTS

| JP | 2005-260733 A | 9/2005 |
| JP | 2005-269356 A | 9/2005 |
| JP | 2006-074530 A | 3/2006 |
| JP | 2006-310971 A | 11/2006 |
| JP | 2007-195038 A | 8/2007 |

OTHER PUBLICATIONS

English language translation of a Japanese Office Action dated Jan. 12, 2010 in counterpart Japanese Application No. 2007-318028.

* cited by examiner

*Primary Examiner* — Rodney Fuller
(74) *Attorney, Agent, or Firm* — Holtz, Holtz, Goodman & Chick, PC

(57) ABSTRACT

The invention is provided to perform exposure control that uses a diagram for monitor-through in a shooting waiting state in which the output frame rate of an image sensor is set into 30 fps and that for high-speed movie recording is performed during move images shooting with the high-speed movie mode in which the output frame rate is set into 300 fps. Upon shifting to exposure control at the high-speed movie mode, the aperture value to be first set is determined uniquely from the current LV value by using a program diagram for preparing to start high-speed movie recording in which the space scale of the program diagram for monitor-through is converted into a space scale similar to that of the diagram for high-speed movie recording. Then, the exposure adjustment that sets the determined aperture value, and the shutter speed and the gain corresponding to thereof as exposure control values.

21 Claims, 5 Drawing Sheets

IMAGING APPARATUS CAPABLE OF CHANGING FRAME RATE

This application is based on and claims the benefit of priority from Japanese Patent Application No. 2007-318028, filed on 10 Dec. 2007, the content of which is incorporated herein by reference.

BACKGROUND OF THE INVENTION

1. Field of the Invention

The present invention relates to imaging apparatus capable of changing frame rate upon imaging, and a method and a program for controlling the same.

2. Related Art

Conventionally, there has been imaging apparatus capable of changing frame rate upon imaging. In such imaging apparatus, an exposure time per frame is limited to within an inter-frame spacing determined by the frame rate. In addition, in the case in which recorded moving images are reproduced to be watched, image continuity between frames weakens when the ratio of the exposure time to the inter-frame spacing is small. This leads to lose smooth image reproduction. Therefore, while moving images are recorded, automatic exposure (AE) control to adjust the exposure time so that the ratio of the exposure time to the inter-frame spacing increases as much as possible is often conducted. The frame rate increases upon imaging while such automatic exposure (AE) control is being conducted, and then the exposure time per frame shortens. On the other hand, in typical automatic exposure control, exposure control values such as an aperture value, a shutter speed, and an amplification factor upon imaging in the subsequent frame is determined in accordance with the brightness of the image imaged in the previous frame. Thus, the change cannot be followed up even if the exposure time changes with a change of the frame rate as described above, whereby the image immediately after a change of the frame rate often significantly darkens.

As an art for solving the above-mentioned problem, for example, the Japanese Published Unexamined Patent Application Publication No. 2007-195038 discloses that, a correction amount for offsetting the changed portion (decrease) of the exposure time is calculated when the exposure time shortens, owing to the increasing frame rate of the subsequent frame. The above-mentioned patent application further discloses the art that the exposure control values (i.e., controlled variables) such as the aperture value and the amplification factor of the output signal once determined are preliminarily corrected by adding the above-mentioned correction amount in accordance with the level of an output signal of an image sensor, and then an exposure is controlled by using the corrected aperture value and the amplification factor of the output signal when the subsequent frame is imaged. According to the above-mentioned art, a change of brightness of the image imaged when the frame rate changes to be higher upon imaging can be prevented.

However, in the above-mentioned art, it is not necessarily the case that the corrected exposure control values and the combination thereof are appropriate for subsequent imaging because the exposure control values such as the aperture value, the shutter speed, and the amplification factor of the output signal, which are to be set immediately after a change of the frame rate, are corrected uniformly by the correction amount for offsetting the changed portion of the exposure time in response to a change of the frame rate.

That is, in exposure control, for example, when control conditions of maintaining a low amplification factor of the output signal to prevent an image quality from deteriorating and of reducing the frequency of changes of the aperture value is reduced to suppress generation of noise such us driving noise in aperture operation, exist, it is necessary to control each of exposure control values and the combination thereof according to these control conditions. However, there has been a problem that it is not necessarily the case that the corrected exposure control values satisfy these control conditions in the above-mentioned art.

SUMMARY OF THE INVENTION

In one aspect of the present invention, imaging apparatus comprises:

an imaging unit capable of changing a frame rate;

an exposure control unit performing automatic exposure control according to a control condition of specifying how to change a combination of a plurality of shooting parameters including an exposure time and an lens aperture value of this imaging unit in accordance with the brightness of an object; and a control unit changing the control condition when the exposure control unit performs automatic exposure control into another control condition of narrowing the change of the lens aperture value as compared with that before the frame rate changes, in the case in which the frame rate of the imaging unit changes from a first frame rate to a second frame rate which is higher than the first frame rate.

In another aspect of the present invention, a method for controlling exposure of imaging apparatus comprises steps of:

specifying, for imaging apparatus provided with an imaging unit capable of changing a frame rate and an exposure control unit performing automatic exposure control according to a control condition of specifying how to change a combination of a plurality of shooting parameters including an exposure time and an lens aperture value of this imaging unit in accordance with the brightness of an object, in the case in which the frame rate of the imaging unit is the first frame rate, a control condition of allowing the lens aperture value to change in accordance with the brightness of an object as the control condition when the exposure control unit performs automatic exposure control;

changing the frame rate of the imaging unit changes from a first frame rate to a second frame rate which is higher than the first frame rate; and specifying a control condition of suppressing the change of the lens aperture value in accordance with the brightness of an object as the control condition when the exposure control unit performs automatic exposure control, in the case in which the frame rate of the imaging unit changes into the second frame rate.

In yet another aspect of the present invention, a storage medium for storing a computer executable program, wherein the computer, which is included in imaging apparatus provided with an imaging unit capable of changing the frame rate and an exposure control unit performing automatic exposure control according to a control condition of specifying how to change a combination of a plurality of shooting parameters including an exposure time and an lens aperture value of this imaging unit in accordance with the brightness of an object, stores the exposure control program that executes a process for changing the control condition when the exposure control unit performs automatic exposure control into another control condition of narrowing the change of the lens aperture value as compared with that before the frame rate changes, in the case in which the frame rate of the imaging unit changes from a first frame rate to a second frame rate which is higher than the first frame rate.

DETAILED DESCRIPTION OF THE INVENTION

Figure 1:
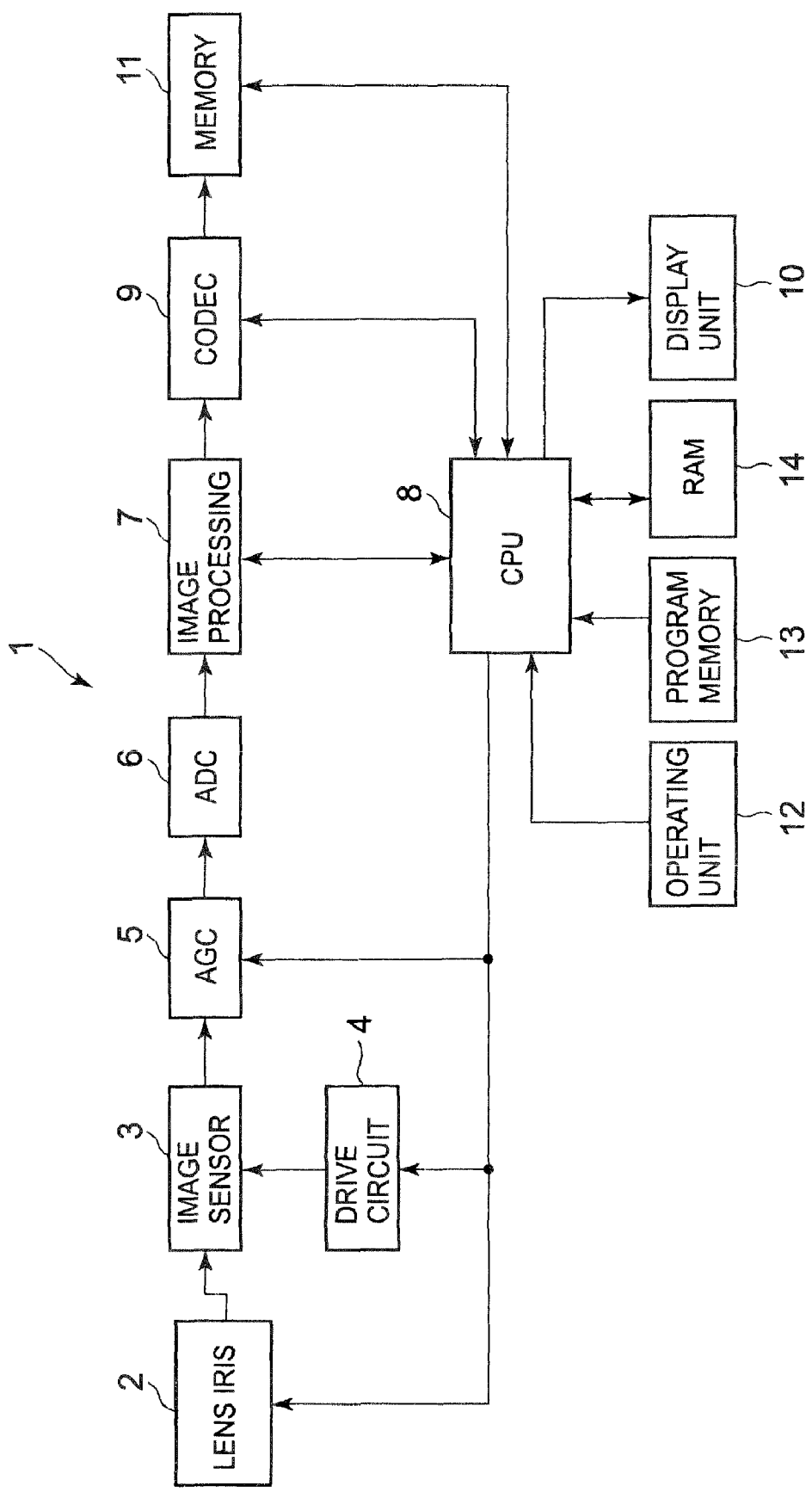
FIG. 1 is a block diagram illustrating a digital camera according to the present invention.

Embodiments of the present invention are described with reference to the accompanied drawings hereafter. FIG. 1 is a block diagram illustrating a general configuration of a digital camera 1 according to the present invention. This digital camera 1 has shooting modes: a still image shooting mode and a moving image shooting mode.

The digital camera 1 is provided with a lens iris block 2 consisting of an optical system including a zoom lens and a focus lens, a lens motor driving the optical system, an aperture, and an actuator driving to open and close the aperture. While the lens motor and the actuator operate based on a command from a CPU 8, an optical image of an object is focused onto an image sensor 3 through the optical system and the aperture.

In the present embodiment, the image sensor 3 is a CMOS sensor, which has a plurality of drive modes with various output frame rates. The image sensor 3 is driven at various output frame rates by a drive circuit 4 as required and photoelectrically converts the optical image of the object and then outputs the converted optical image to AGC 5 as a picture signal. In the present embodiment, the driving mode of image sensor 3 includes the following three modes: a monitor-through mode (live view mode) of 30 fps used at a still and a moving image shooting modes in a shooting waiting state, a normal moving image recording mode of 60 fps used when a normal movie mode is set as a lower mode upon shooting with the moving image shooting mode, and a high-speed moving image recording mode of 300 fps used when a high-speed movie mode is set upon shooting with the moving image shooting mode.

AGC 5 is an analog gain controller, which adjusts the gain of the input image signal based on a command from the CPU 8 and then outputs the adjusted gain to ADC 6. ADC 6 is an analog digital converter, which the input image signal into a digital image data and then outputs the data to an image processing unit 7.

The image processing unit 7 performs various image processes such as a gamma correction of the input image data after the gain is adjusted, white balance adjustment according to types of shooting light sources, generation color component (R, G, and B) data of each pixel, and YUV conversion that generates YUV data from the generated RGB data. Then, the image processing unit 7 outputs the generated YUV data to the CPU 8 and a CODEC 9 (encoder and decoder). The YUV data output to the CPU 8 is converted into a video signal in a display unit 10 (display means) consisting of a liquid crystal monitor and a drive circuit thereof and then displayed on the liquid crystal monitor as a through image (live view image).

The YUV data output to the CODEC 9, upon shooting with the still image mode, is compressed (encoded) in JPEG format or the like and then recorded in a memory 11 as a still image file and, upon shooting with the moving image mode, is compressed (encoded) in MPEG format or the like with respect to each frame and then sent sequentially to the memory 11 to be recorded as a moving image file. In addition, the CODEC 9 decodes the still or the moving image data (encoded data) read from memory 11 by the CPU 8 with a reproduction mode and then outputs the decoded data to the CPU 8. The decoded data is reproduced as a still or a moving image in the display unit 10. For example, the memory 11 includes a flash memory built in a camera body and various types of memory cards detachable from the camera body.

The CPU 8 connects with an operating unit 12, a program memory 13, and a RAM 14. The operating unit 12 consists of various operation buttons and the like, such as a shutter key, a zoom key for accepting user's operation of the digital camera 1.

The CPU 8 controls each of the above-mentioned parts by executing various programs stored in the program memory 13, using the RAM 14 as a working memory. Especially, the program memory 13 stores an exposure control program according to the present invention is stored in and functions as an exposure control means (exposure control unit), a control means (control unit), an imaging start timing control means (imaging start timing control unit), and a set means (set unit) of the present invention by controlling automatic exposure (AE) described hereinafter at the moving image shooting mode.

In addition, the program memory 13 is a nonvolatile memory in which the stored data is rewritable, which stores control data for executing control corresponding to a plurality of types of program diagrams used for AE control by the CPU 8 other than the above-mentioned program. In addition, the program memory 13 stores initial setting information regarding a region used, a language used, and the like, and a function setting information regarding various types of changeable function settings of the digital camera 1 as required.

Then, in digital camera 1 consisting of the above-mentioned components, operation according to the present invention when a user shoots moving images with the high-speed movie mode is described hereinafter. At this point, as a matter of accommodation, it is premised that "Kanto" is set into the above-mentioned initial setting information as a region where the camera is used, and that a fluorescent lamp is set by an automatic or a manual operation as an optical source upon shooting.

Figure 2:
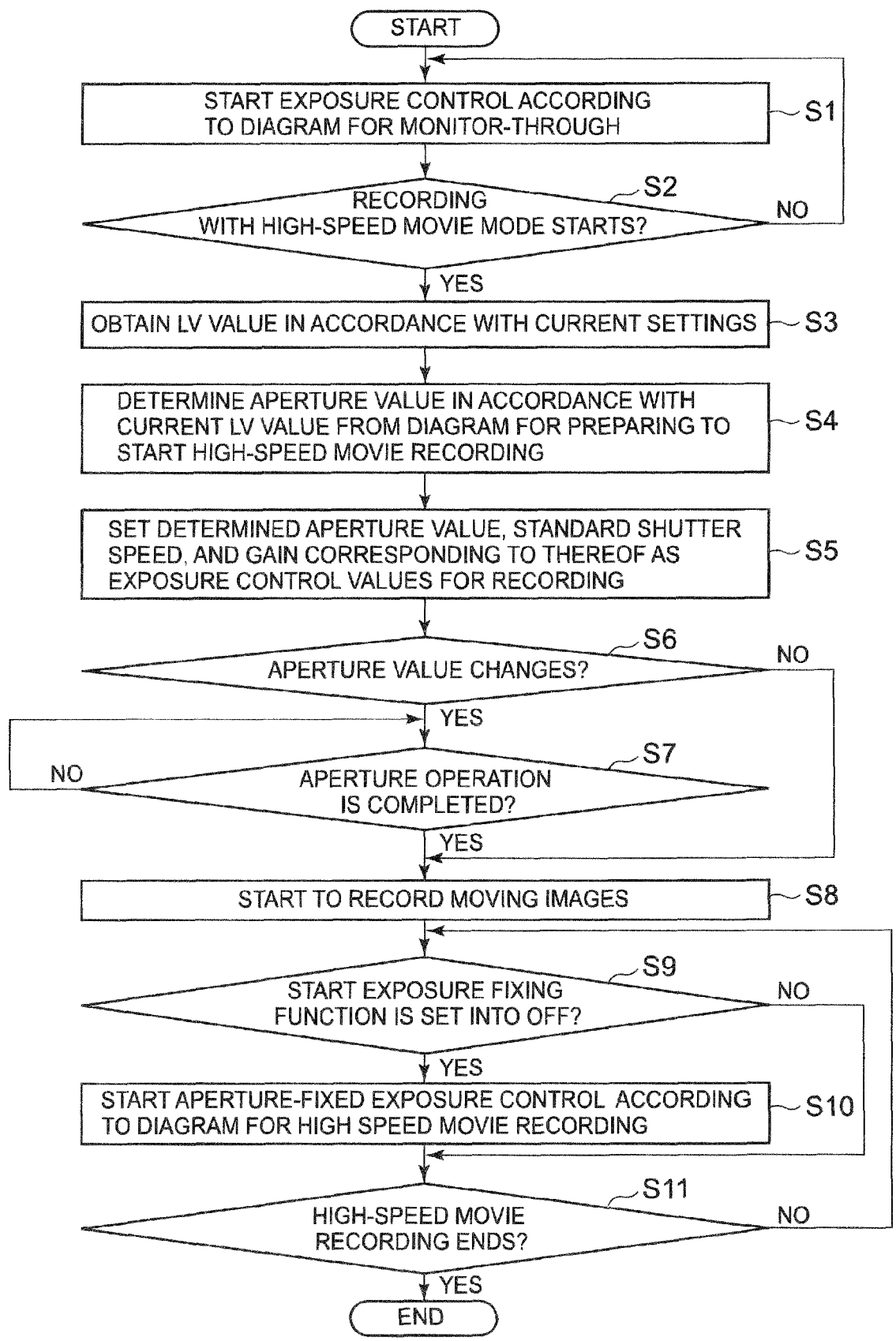
FIG. 2 is a flow chart illustrating an exposure control procedure executed by a CPU when moving images are shot with a high-speed movie mode.

FIG. 2 is a flow chart illustrating a process procedure executed by the CPU 8 mainly regarding AE control when the high-speed movie mode is selected for the moving image shooting mode.

That is, the CPU 8 starts operation while setting of the moving image shooting mode, and then immediately starts driving the image sensor 3 at the monitor-through mode (the output frame rate of 30 fps) while starting the exposure control described below (Step S1) by using the program diagram (third program diagram) for monitor-through shown in FIG. 3. The program diagram is selected from a plurality types of program diagrams prepared in the program memory 13 based on information regarding the region used where the camera is used which is included in the initial setting information.

This program diagram for monitor-through as well as other program diagrams as described hereinafter illustrates a control condition when automatic exposure (AE) control that automatically secures a correct exposure in accordance with the brightness of an object. That is, this diagram illustrates how to change a combination of a plurality of shooting parameters (exposure control values) in accordance to the change of brightness of the object. This diagram specifies, a combination of set values: a shutter speed (exposure time) necessary to obtain a correct exposure when an object has any brightness (LV value), an aperture value (the opening of an aperture), and a gain of AGC 5 (the amplification factor of an imaging signal) In this diagram, the diagonal axes represent the brightness (LV value), the longitudinal axes represent the aperture value (F number), and the lateral axes on the right of the bold broken line at the center represent the shutter speed (sec) and that on the left represent the gain (db).

Each program diagram shows that automatic exposure (AE) control is executed based on various control conditions respectively, corresponding to each operation mode. This program diagram for monitor-through shows a control condition of effective automatic exposure (AE) control, especially at the monitor-through mode (live view mode).

In this program diagram, for example, when the brightness of the object is "9 LV", combinations of "F4", "1/50", and "+6 dB" and "F5.6", "1/50", and "+12 dB" are allowed as a combination of exposure control values. The aperture value is limited to "F4.0" and "F5.6". Then, hysteresis is added to the change of the aperture value to that of brightness. That is, a point for changing the aperture value (LV value) is different between the cases in which the brightness of the object changes to be brighter and darker. Accordingly, the changing timing of the aperture value with hysteresis is slower than that without hysteresis, so that the frequency of the aperture operation can be reduced as much as possible. This leads to suppress electric power consumption in the shooting waiting state.

In addition, the shutter speed and the gain is set into "1/50" and "0 dB" respectively in vicinity of the center represented by a bold broken line. When an object lightens more than the brightness represented by the broken line, a correct exposure is secured by changing the shutter speed. When the object is darker more than the brightness represented by the broken line, the correct exposure is secured by changing the gain. The lower limit of the shutter speed is limited to the shutter speed corresponding to the power frequency of the region used. Accordingly, this can prevents an occurrence of a fluorescent light flicker.

It has been described herein that the case in which the region used where the camera is used is set into "Kanto" (east area of Japan) where the power frequency is 50 Hz. In this setting, a program diagram in which an adjustable ranges of the shutter speed and the gain are set into "1/50-1/4000" and "0 dB-+30 dB" respectively is used as the program diagram for monitor-through. However, when a power frequency of the region used where the camera is used, such as "Kansai" (west area of Japan) and the United States is set into 60 Hz, another program diagram for other monitor-through in which the lower limit of the shutter speed is set into "1/60" is used.

In addition, any method for selecting a diagram for monitor-through is actually used. Thus, a power frequency of the shooting location may be determined based on other information such as brightness information in several frames of images imaged immediately after the moving image shooting mode is set and then select a program diagram for monitor-through to be used based on the determination result. Furthermore, a method may allow a user to select a power frequency at any time. Thus, the last selected power frequency may be stored in the program memory 13 and the like, and then the power frequency is selected based on the stored ones.

Figure 4:
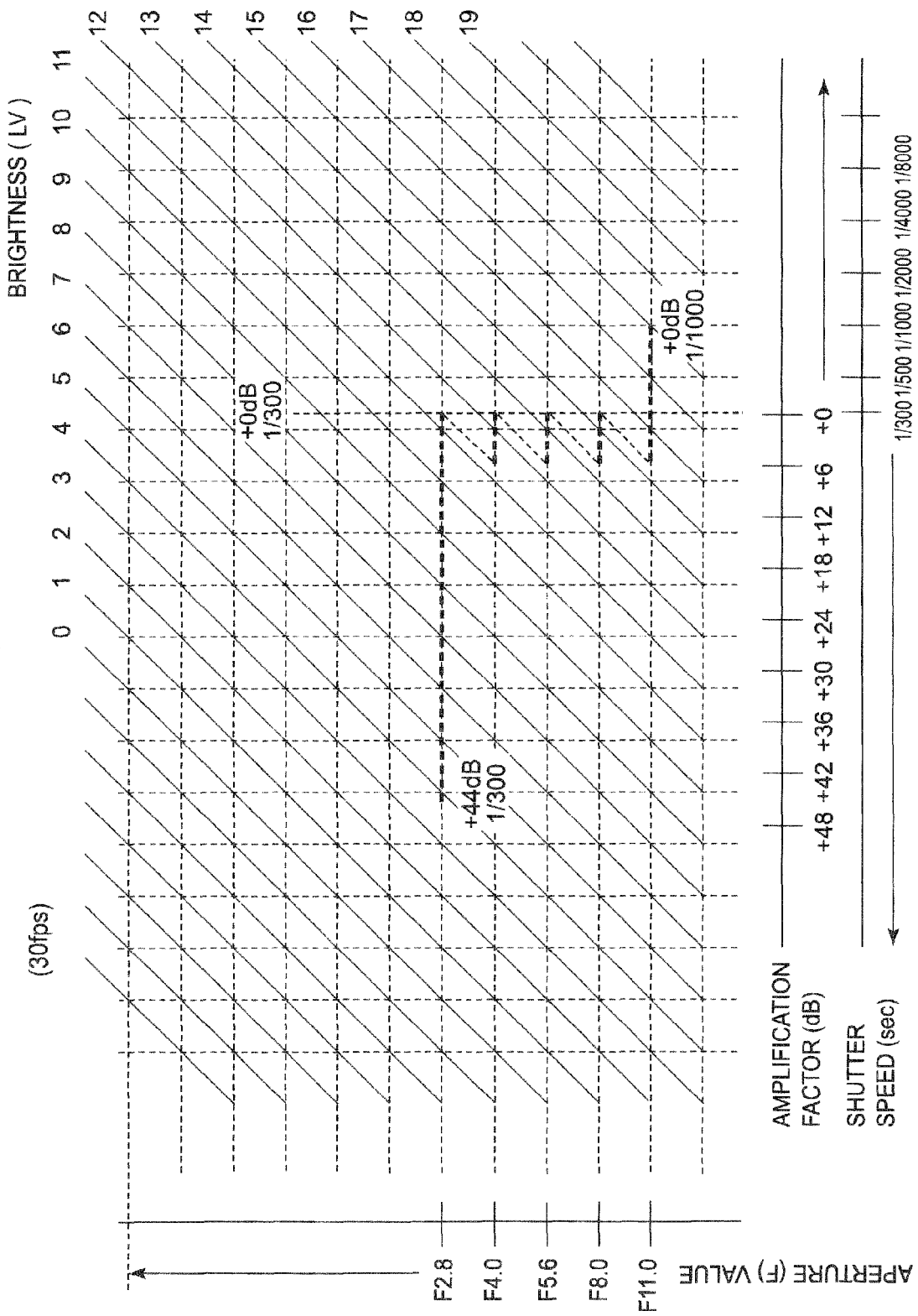
FIG. 4 is a program diagram for preparing to start high-speed movie recording used for determining an aperture value corresponding to an LV value uniquely.

When being instructed to start shooting with the high-speed movie mode, namely, moving image recording (YES in Step S2) while continuously repeating the above-mentioned exposure control, the CPU 8 first obtains a present brightness (LV value) of an object from each setting of exposure control values for that time (Step S3) and then determines the aperture value corresponding to the present LV value uniquely based on the obtained brightness (LV value) of the object by the program diagram (second program diagram) for preparing to start high-speed movie recording as shown in FIG. 4 which is prepared in the program memory 13 (Step S4).

This program diagram for preparing to start high-speed movie recording illustrates a control condition of automatic exposure (AE) control to be temporarily executed until switching into the high-speed movie mode to be started. That is, this program diagram is for determining the aperture value in the program diagram for high-speed movie recording used upon shooting with the high-speed movie mode. The aperture value is initialized into a fixed value. This aperture value (fixed value) is an aperture value capable of satisfying the following control condition upon shooting with the high-speed movie mode. The is, this control condition is a control condition of lengthening the exposure time for each frame as much as possible to prevent an image from deteriorating due to the increased gain and appropriately controlling the exposure time and the amplification factor are even if the aperture is fixed to secure a wider range of the brightness of an object which is capable of following up to secure a correct exposure. Specifically, the program diagram is composed as follows.

Figure 3:
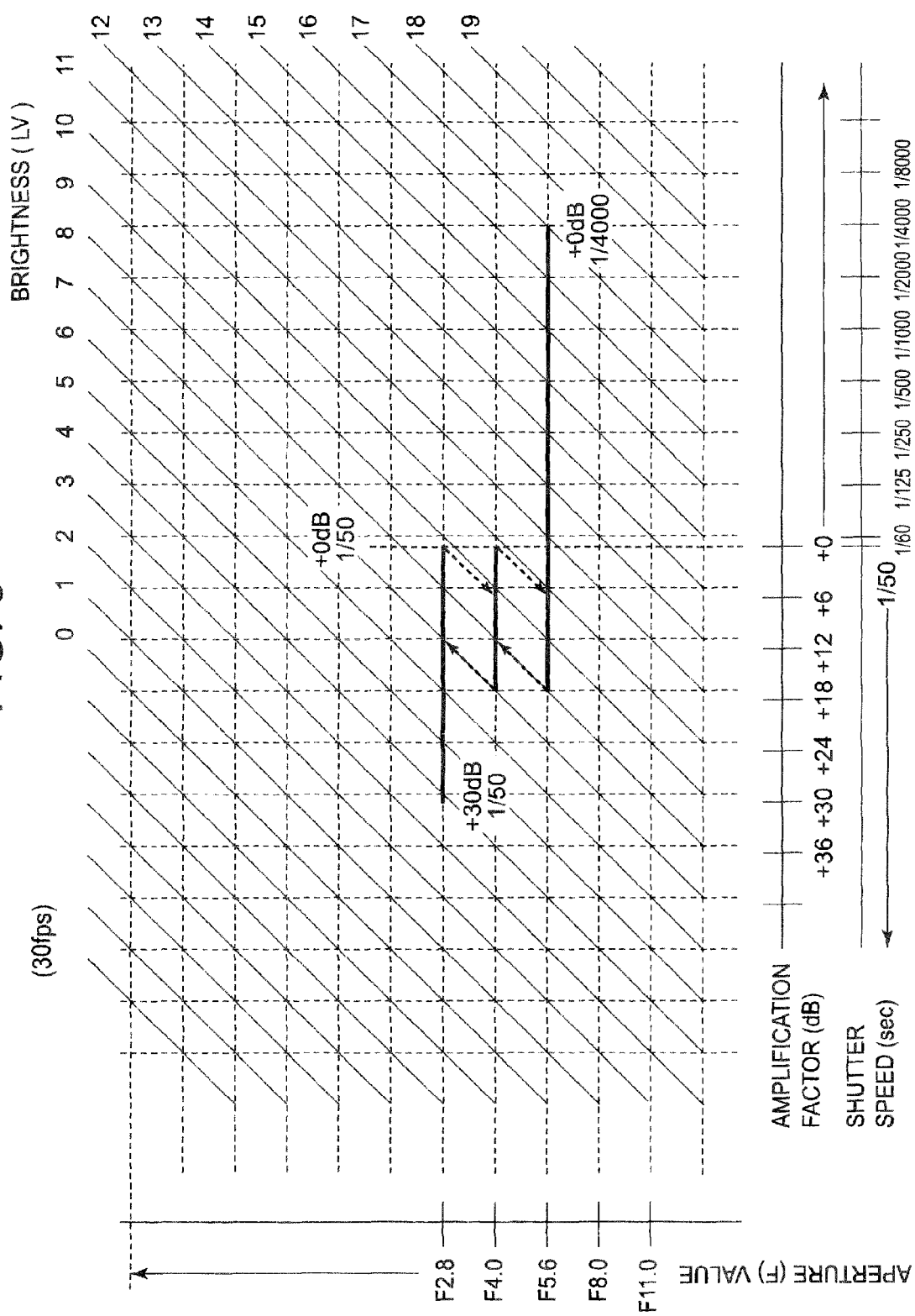
FIG. 3 is a program diagram for monitor-through, which is used upon exposure control in a shooting waiting state.

That is, the program diagram for preparing to start high-speed movie recording is a program diagram in which the space scale in the above-mentioned program diagram for monitor-through in FIG. 3 is converted into that in a diagram space scale similar to the diagram for high-speed movie recording (see FIG. 5) as described hereinafter. That is, a space scale, which is an alignment of each values: the brightness (LV value), the aperture value (F number), the shutter speed (sec) and the gain (db) represented by the diagonal, the longitudinal, and the lateral axes, respectively, in the program diagram, is converted. Specifically, the lower limit of a low-speed side within the adjustable range of the shutter speed, which is the upper limit of the long time side of the exposure time, changes into "1/300". That is, it changes into a configurable lowest speed at the high-speed movie mode in which the output frame rate of the image sensor 3 is "300 fps". In addition, the LV value of the diagonal axis shifts to a brighter side accordingly, and then the LV and the aperture values (represented by a broken line in the figure) have a relationship of "one-to-one" or "many-to-one".

Subsequently, the CPU 8 sets the aperture value as the exposure control value that is determined by using the above-mentioned program diagram for preparing to start high-speed movie recording, the shutter speed into the configurable lowest speed (1/300) at the high-speed movie mode, and then the gain into a value corresponding to the set aperture value and the set shutter speed (Step S5). For example, the gain is set into "+2 dB" when the LV value is "12 LV".

At this point, if the aperture value changes (YES in Step S6), the process awaits for completing aperture operation that is opening changing operation in accordance with the aperture value (YES in Step S7), changes the driving mode of the image sensor 3 into the high-speed moving image recording mode in which is the output frame rate is 300 fps, and then starts to record moving images with the high-speed movie mode (Step S8). This leads to prevent the aperture operation such as a change of brightness of an image from appearing in images first recorded at the first recorded several frames. That is, when moving image recording start immediately, for example, the aperture operating time until the opening corresponding to the aperture value after the driving mode changes is obtained is about 3 msec, the aperture operation may appear in about first five frames, which is to be prevented. In addition, if the aperture value does not change (NO in Step S6), the process starts moving image recording with the high-speed movie mode immediately (Step S8).

Figure 5:
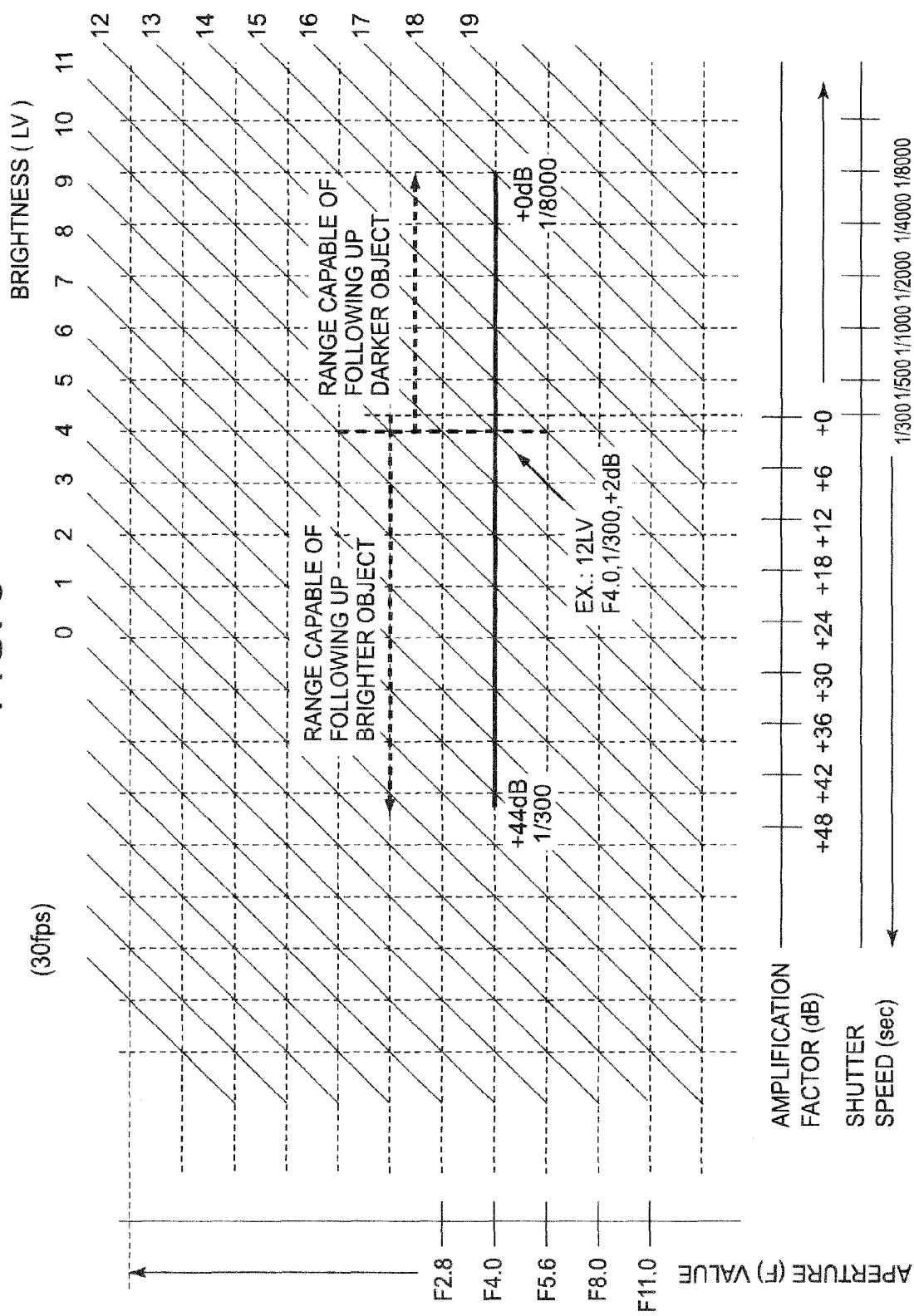
FIG. 5 is a program diagram for high-speed movie recording, which is used upon exposure control during shooting with the high-speed movie mode.

Then, when a function regarding the content of exposure control at the high-speed movie mode that is an "exposure fixing" function in which a user can set into ON/OFF as requiring is set into OFF, that is, when the exposure control mode is set into an exposure fixing mode (YES in Step S9), the CPU 8 repeatedly executes exposure control using the program diagram (first program diagram) for high-speed movie recording shown in FIG. 5 during recording a moving image until being instructed to end shooting (moving image recording) (Step S10, NO in Step S11).

This program diagram for high-speed movie recording is prepared to execute aperture-oriented (aperture-fixed) exposure control that changes only the shutter speed and the gain in accordance to the change of brightness of an object without changing the aperture value. Specifically, as outlined above, this is a program diagram having the same space scale as that in the above-mentioned program diagram for preparing to start high-speed movie recording of FIG. 4, which executes the above-mentioned aperture-oriented exposure control, which is represented by bold lines in FIG. 5. Executing exposure control using the program diagram for high-speed movie recording prevents the aperture operation as described above such as a change of brightness of an image from appearing in a moving image, and it also prevents noise such as driving noise from occurring, by the aperture during recording a moving image from being generating. At the same time, electric power consumption during shooting can be suppressed.

The program diagram shown in FIG. 5 is a program diagram when the aperture value to be determined and fixed in the above-mentioned Step S4 is "F4". In this case, at the time of start shooting with the high-speed movie mode when the brightness is 12 LV, the shutter speed is "1/300" and the gain is "+2 dB" as illustrated in the figure.

In contrast, when the above-mentioned "exposure fixing" function is set into ON (NO in Step S9), moving image recording continues (NO in Step S11) until being instructed to end shooting (moving image recording), maintaining the aperture value, the shutter speed, and the gain set in the above-mentioned Step S5 before the start of moving image recording with the high-speed movie mode. Therefore, shooting can be conducted while all the set values of the aperture value, the shutter speed, and the gain are fixed by maintaining "exposure fixing" function set into ON as required. For example, when an object is shot at high-speed with a fixed camera, moving images to capture a movement of the object easily can be obtained by setting the "exposure fixing" function into ON.

In addition, when the "exposure fixing" function is set into ON, the shutter speed (exposure time) does not change, and thus the ratio of the exposure time to the inter-frame spacing doesn't change. Accordingly, moving images can be reproduced smoothly with high inter-frame image continuity.

Then, the CPU 8 ends all process at the time when being instructed to end shooting (moving image recording) (YES in Step S11).

At this point, in the above-mentioned exposure control, when shooting moving images with the high-speed movie mode starts from the shooting waiting state, the aperture value is determined in prior to the shutter speed and the gains, as described above, and then the shutter speed and the gain are set in accordance with the determined aperture value, upon securing a correct exposure immediately after the output frame rate changes.

Therefore, even if the output frame rate of the image sensor 3 changes greatly, for example, from 30 fps to 300 fps, so that the shutter speed requires to be changed, the change of brightness of an imaged image in response to a change of the frame rate can be prevented while the exposure control that satisfies the above-mentioned control condition upon shooting with the high-speed movie mode as described above is executed.

In the present embodiment, it has been described herein that the aperture value is determined in prior to the shutter speed and the gain upon securing a correct exposure immediately after a change of the output frame rate of the image sensor 3. However, the gain may be determined in prior to the shutter speed and the aperture value depending on the content of the control condition required for exposure control immediately after a change of the output frame rate.

In addition, it is described the case in which the control condition required for exposure control upon shooting moving images with the high-speed movie mode includes lengthening an exposure time in each frame as much as possible, and the shutter speed to be set immediately after a change of the output frame rate is set into the adjustable lowest speed. However, the case in which the shutter speed to be set immediately after a change of the output frame rate is not specified in particular falls within the scope of the present invention.

In addition, the case in which shooting with the high-speed movie mode starts from the shooting waiting state is pointed to as an example of the case in which the output frame rate of the image sensor 3 changes. However, in cases other than the above-mentioned case, for example, the above-mentioned exposure control may be performed upon changing the normal movie mode to the high-speed movie mode during shooting into the moving image shooting mode in a structure in which the above-mentioned normal movie mode and high-speed movie mode can switch to each other appropriately. Even this case falls within the scope of the present invention.

In addition, in the structure in which a plurality of the high-speed movie modes with various output frame rates (for example, 300 fps, 600 fps, and 1200 fps) are prepared, the above-mentioned exposure control is performed when the high-speed movie mode changes into another high-speed movie mode with a higher output frame rate during shooting. Even this case falls within the scope of the present invention.

It has been described herein that the present invention is applied to a digital camera with a moving image shooting feature. However, other imaging apparatus, which are provided with an image sensor capable of changing the output frame rate and an automatic exposure control function according to a predetermined control condition, can be applied to a digital video camera, a mobile phone terminal with a camera, and the like.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. An imaging apparatus comprising:
an imaging unit capable of changing a frame rate;
an exposure control unit which performs automatic exposure control according to a control condition that specifies how to change a combination of a plurality of types of shooting parameters including an exposure time and a lens aperture value of the imaging unit in accordance with a brightness of an object; and
a control unit which changes the control condition when the exposure control unit performs the automatic exposure control to a control condition that restricts a change of the lens aperture value as compared with before a change in the frame rate, in a case in which the frame rate of the imaging unit changes from a first frame rate to a second frame rate which is higher than the first frame rate,
wherein the control unit changes the control condition when the exposure control unit performs the automatic exposure control to a control condition that reduces an upper limit of the adjustable exposure time as compared with before the change in the frame rate, in the case in which the frame rate of the imaging unit changes from the first frame rate to the second frame rate.

2. The imaging apparatus according to claim 1, wherein the control unit changes the control condition when the exposure control unit performs the automatic exposure control to a control condition that sets a second exposure time that is a longest exposure time limited by the second frame rate to be the upper limit of the adjustable exposure time, in the case in which the frame rate of the imaging unit changes to the second frame rate.

3. The imaging apparatus according to claim 2, wherein the control unit changes the control condition when the exposure control unit performs the automatic exposure control to a condition that specifies a lens aperture value for securing a correct exposure with the exposure time set to the second exposure time and then fixes the adjustable lens aperture value to the specified lens aperture value, in the case in which the frame rate of the imaging unit changes to the second frame rate.

4. The imaging apparatus according to claim 3, wherein the control unit changes the control condition when the exposure control unit performs the automatic exposure control to a control condition that fixes the adjustable lens aperture value and the adjustable exposure time to the specified lens aperture value and the second exposure time, respectively, in the case in which the frame rate of the imaging unit changes to the second frame rate.

5. The imaging apparatus according to claim 4, wherein the control unit changes the control condition when the exposure control unit performs the automatic exposure control to a control condition that fixes all of the shooting parameters, including an amplification factor, in the case in which the frame rate of the imaging unit changes to the second frame rate.

6. The imaging apparatus according to claim 3, wherein the control unit changes the control condition when the exposure control unit performs the automatic exposure control to a condition that changes the exposure time to be shorter when the object changes to be brighter than the object upon securing the correct exposure, and changes an amplification rate to be higher when the object changes to be darker than the object upon securing the correct exposure, in the case in which the frame rate of the imaging unit changes to the second frame rate.

7. The imaging apparatus according to claim 6, wherein the control unit changes the control condition when the exposure control unit performs the automatic exposure control to a condition that defines, as a standard state, a state of setting the adjustable lens aperture value and the adjustable exposure time to the specified lens aperture value and the second exposure time, respectively, and then changes the standard state in response to the change of brightness of the object when the brightness of the object changes as compared to the object upon securing the correct exposure, in the case in which the frame rate of the imaging unit changes to the second frame rate.

8. The imaging apparatus according to claim 7, wherein a plurality of modes are provided as exposure control modes, and the control unit changes the control condition when the exposure control unit performs the automatic exposure control to a control condition that changes the standard condition in accordance with the change of the brightness of the object when the exposure control mode is not set into an exposure fix mode, and to a control condition that fixes all of the shooting parameters when the exposure control mode is set to the exposure fix mode, in the case in which the frame rate of the imaging unit changes to the second frame rate.

9. The imaging apparatus according to claim 2, wherein the control unit specifies a control condition that sets a first exposure time that is determined in accordance with a longest exposure time limited by the first frame rate and that is longer than the second exposure time to be the upper limit of the adjustable exposure time, in a case in which the frame rate of the imaging unit is the first frame rate.

10. The imaging apparatus according to claim 9, wherein the control unit specifies a control condition that sets a first exposure time that is determined in accordance with the longest exposure time limited by the first frame rate and a predetermined exposure time corresponding to a power frequency to be the upper limit of the adjustable exposure time, in the case in which the frame rate of the imaging unit is the first frame rate.

11. The imaging apparatus according to claim 10, wherein the control unit changes the control condition when the exposure control unit performs the automatic exposure control to a control condition in which the upper limit of the adjustable exposure time depends on various power frequencies of regions used.

12. The imaging apparatus according to claim 9, wherein the control unit specifies a control condition that changes the lens aperture value when the object darkens to an extent that the exposure time is required to be lengthened more than the first exposure time, in the case in which the frame rate of the imaging unit is the first frame rate.

13. An imaging apparatus comprising:
an imaging unit capable of changing a frame rate;
an exposure control unit which performs automatic exposure control according to a control condition that specifies how to change a combination of a plurality of types of shooting parameters including an exposure time and a lens aperture value of the imaging unit in accordance with a brightness of an object;
a control unit which changes the control condition when the exposure control unit performs the automatic exposure control to a control condition that restricts a change of the lens aperture value as compared with before a change in the frame rate, in a case in which the frame rate of the imaging unit changes from a first frame rate to a second frame rate which is higher than the first frame rate; and a display unit which displays an object image imaged by the imaging unit in a shooting waiting state, wherein the first frame rate is a frame rate used in the shooting waiting state, and the second frame rate is a frame rate used at a high-speed shooting mode provided as a shooting mode.

14. An imaging apparatus comprising:

an imaging unit capable of changing a frame rate;

an exposure control unit which performs automatic exposure control according to a control condition that specifies how to change a combination of a plurality of types of shooting parameters including an exposure time and a lens aperture value of the imaging unit in accordance with a brightness of an object; and a control unit which changes the control condition when the exposure control unit performs the automatic exposure control to a control condition that restricts a change of the lens aperture value as compared with before a change in the frame rate, in a case in which the frame rate of the imaging unit changes from a first frame rate to a second frame rate which is higher than the first frame rate, wherein the control condition is a control condition shown by a predetermined program diagram that specifies a combination of the plurality of types of shooting parameters including the exposure time, the lens aperture value, and an amplification factor, and wherein the exposure control unit performs automatic exposure control securing a correct exposure in accordance with the brightness of the object by moving a position on the program diagram in accordance with a change in the brightness of the object.

15. An imaging apparatus comprising:

an imaging unit capable of changing a frame rate;

an exposure control unit which performs automatic exposure control according to a control condition that specifies how to change a combination of a plurality of types of shooting parameters including an exposure time and a lens aperture value of the imaging unit in accordance with a brightness of an object;

a control unit which changes the control condition when the exposure control unit performs the automatic exposure control to a control condition that restricts a change of the lens aperture value as compared with before a change in the frame rate, in a case in which the frame rate of the imaging unit changes from a first frame rate to a second frame rate which is higher than the first frame rate; and an aperture, opening and closing degrees of which are controlled on a plurality of levels in accordance with the aperture value set by the exposure control unit, wherein the second frame rate is a frame rate for imaging a plurality of times within an aperture opening and closing operation time in response to a change of the aperture value by the exposure control unit.

16. The imaging apparatus according to claim 15, further comprising an imaging start timing control unit which controls a starting timing of an imaging operation by the imaging unit after the aperture opening and closing operation ends, when the exposure control unit changes the aperture value in response to a change of the frame rate.

17. An imaging apparatus comprising:

an imaging unit capable of changing a frame rate;

an exposure control unit which performs automatic exposure control according to a control condition that specifies how to change a combination of a plurality of types of shooting parameters including an exposure time and a lens aperture value of the imaging unit in accordance with a brightness of an object; and a control unit which changes the control condition when the exposure control unit performs the automatic exposure control to a control condition that restricts a change of the lens aperture value as compared with before a change in the frame rate, in a case in which the frame rate of the imaging unit changes from a first frame rate to a second frame rate which is higher than the first frame rate, wherein the control unit controls the exposure control unit to specify the lens aperture value to obtain a correct exposure in accordance with the brightness of the object while shooting parameters other than the lens aperture value are fixed to a predetermined standard condition for the exposure control unit, upon securing the correct exposure by a temporary exposure control in the case in which the frame rate changes from the first frame rate to the second frame rate, and to fix a control condition in which a lens aperture is fixed to the specified lens aperture value as the control condition when the exposure unit performs the automatic exposure control, upon securing the correct exposure by a stationary exposure control after the frame rate of the imaging unit changes to the second frame rate.

18. The imaging apparatus according to claim 17, wherein the predetermined standard state is a state in which an amplification rate is set to a configurable lower limit while the exposure time is set to a second exposure time determined in accordance with a longest exposure time limited by the second frame rate.

19. The imaging apparatus according to claim 18, wherein the control unit specifies a control condition that fixes the lens aperture to the specified lens aperture value upon securing the correct exposure by the stationary exposure control after the frame rate changes to the second frame rate, changes the exposure time to be shorter while the amplification rate is set to the configurable lower limit when the object changes to be brighter than the object upon securing the correct exposure, and changes the amplification rate to be higher while the exposure time is set to the second exposure time when the object changes to be darker than the object upon securing the correct exposure.

20. A method for performing exposure control in an imaging apparatus provided with an imaging unit capable of changing a frame rate and an exposure control unit which performs automatic exposure control according to a control condition that specifies how to change a combination of a plurality types of shooting parameters including an exposure time and an lens aperture value of the imaging unit in accordance with a brightness of an object, the method comprising:

specifying a control condition that allows the lens aperture value to change in accordance with the brightness of the object as the control condition when the exposure control unit performs the automatic exposure control, in a case in which the frame rate of the imaging unit is a first frame rate;

changing the frame rate of the imaging unit from the first frame rate to a second frame rate which is higher than the first frame rate; and specifying a control condition that restricts a change of the lens aperture value in accordance with the brightness of the object as the control condition when the exposure control unit performs the automatic exposure control, in a case in which the frame rate of the imaging unit changes to the second frame rate, wherein the control condition when the exposure control unit performs the automatic exposure control is changed to a control condition that reduces an upper limit of the adjustable exposure time as compared with before the change in the frame rate, in the case in which the frame rate of the imaging unit changes from the first frame rate to the second frame rate.

21. A non-transitory computer readable storage medium having a program stored thereon which is executable by a computer of an imaging apparatus provided with an imaging unit capable of changing a frame rate and an exposure control unit which performs automatic exposure control according to a control condition that specifies how to change a combination of a plurality types of shooting parameters including an exposure time and an lens aperture value of the imaging unit in accordance with a brightness of an object, the program controlling the computer to execute functions comprising:

changing the control condition when the exposure control unit performs the automatic exposure control to a control condition that restricts a change of the lens aperture value as compared with before a change in the frame rate, in a case in which the frame rate of the imaging unit changes from a first frame rate to a second frame rate which is higher than the first frame rate, wherein the control condition when the exposure control unit performs the automatic exposure control is changed to a control condition that reduces an upper limit of the adjustable exposure time as compared with before the change in the frame rate, in the case in which the frame rate of the imaging unit changes from the first frame rate to the second frame rate.

* * * * *